Feb. 18, 1930.  E. L. SCHELLENS  1,747,185
RAILWAY TRUCK
Filed June 19, 1926
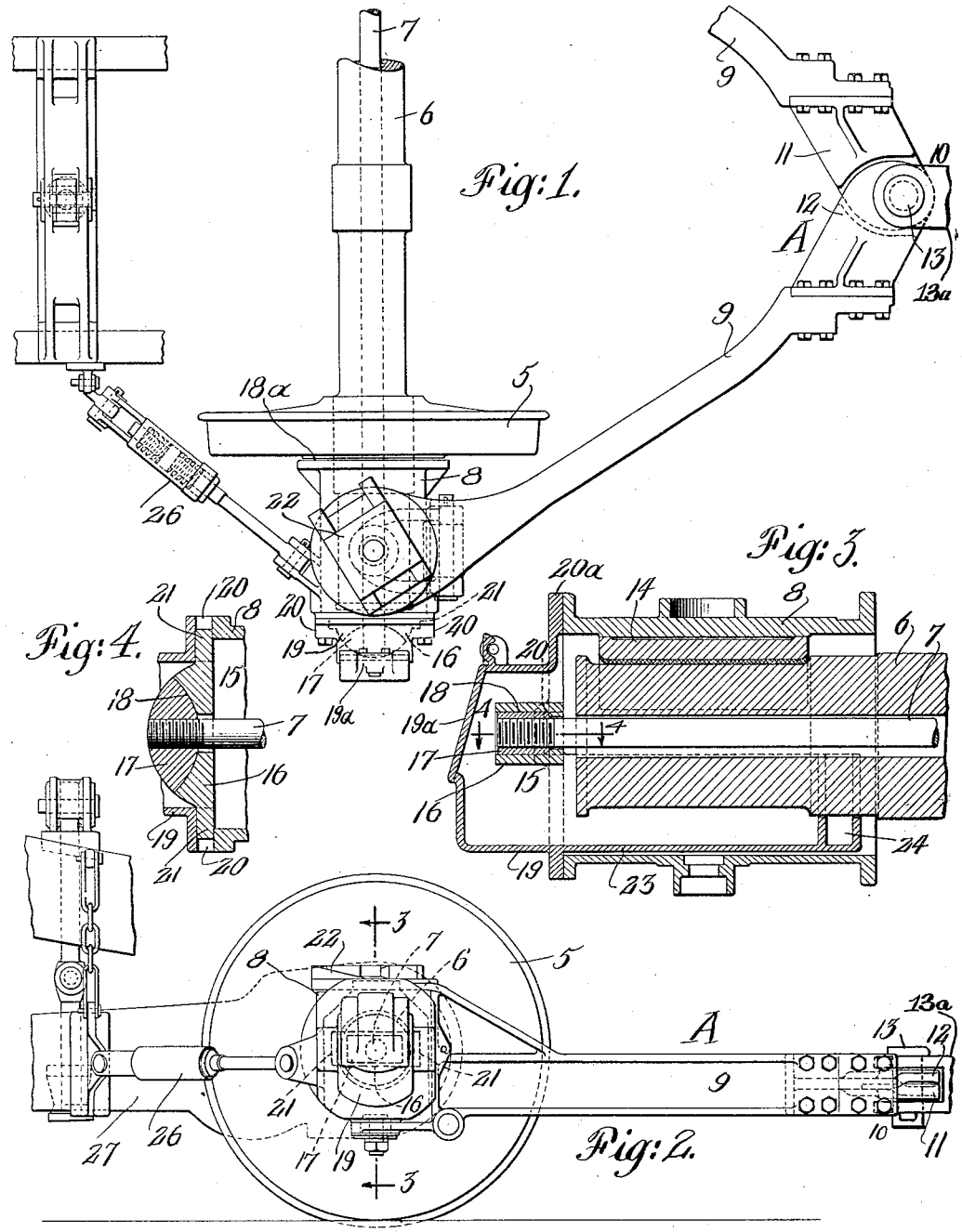
INVENTOR
Eugene Levering Schellens
BY
Synnestvedt + Lechner
ATTORNEYS Patented Feb. 18, 1930

1,747,185

UNITED STATES PATENT OFFICE

EUGENE LEVERING SCHELLENS, OF MILLBURN, NEW JERSEY, ASSIGNOR TO C-S ENGINEERING COMPANY, OF JERSEY CITY, NEW JERSEY, A CORPORATION OF DELAWARE

RAILWAY TRUCK

Application filed June 19, 1926. Serial No. 117,028.

This invention has reference to an improved arrangement of railway trucks particularly such type of truck as is commonly used in locomotive practice for a trailer truck, exemplifications of which are to be found in the two applications filed jointly by myself and Joel S. Coffin, Jr., Serial Numbers 30,435 and 45,496, which issued respectively as Patents 1,621,606 and 1,648,964, bearing the dates, respectively, March 22, 1927 and November 15, 1927.

The first of the objects of this present invention is to provide a truck of the general character specified in which the frame parts or longitudinal side members will be arranged in what may be termed articulated or hinged relation with suitable connection at the point of articulation and free to swing inwardly and outwardly in direction toward or away from the wheels a sufficient amount to compensate for necessities of adjustment in the fit of the journal box bearing and also to take up wear on the lateral or thrust bearings between the journal box and the wheels or the axles.

More generally stated it is an object of this invention to provide a truck of the character described in which the strains ordinarily imposed on the truck arms, or side members, are eliminated.

A rod extending thru the center of a hollow axle in a truck of this character with means for adjusting the same at the ends is shown in the copending case above referred to as No. 30,435 (Pat. No. 1,621,606), and this improvement has relation to the provision of novel frame members and mountings for the same to cooperate with such a take-up rod in making suitable adjustments.

A further object of the invention is the provision of such improved form of journal box casing, to be used preferably in association with the take-up mechanism referred to, as will be more specifically hereinafter described.

Another object is to provide a truck which is simple and light in structure and easy and economical to manufacture.

In order that the above as well as such other objects as may hereinafter appear may be better understood, I will proceed to describe the same in connection with the accompanying drawing, in which Fig. 1 is a fragmentary plan view of a truck embodying my improvement;

Fig. 2 is a side elevation of the same truck;

Fig. 3 is a sectional view of the journal box mechanism taken substantially on the line 3—3 of Fig. 2; and Fig. 4 is a horizontal fragmentary section taken on the line 4—4 of Fig. 3.

Referring now more particularly to Fig. 1 it will be seen that the truck structure comprises in general the wheels 5, of which one is shown, the hollow axle 6, the rod 7 extending thru the axle for a purpose to be hereinafter described, the journal boxes 8 and the frame structure indicated as a whole by the reference letter A.

The frame structure A comprises the side members or arms 9, 9 pivoted or hinged together at 10 thru the medium of the castings 11 and 12 and the pin 13, said pin preferably serving also as the pivot point of the truck upon a suitable portion 13ª of the locomotive structure. At their free ends the side members 9, 9 carry the journal boxes 8 which in this instance are shown trunnioned to the side members on a vertical axis. A suitable bearing block 14 is provided in the journal boxes 8.

To prevent the boxes 8 from spreading and also to take up wear I have provided the rod 7 extending thru the hollow axle, by means of which the boxes are tied or connected together. Adjacent each end of the rod 7 I have provided a clamping device 15 which engages the outer face of the bearing box proper. This clamping device comprises a clamp member 16 and a nut 17 adapted to be threaded on the rod 7. The member 16 is recessed at 18, said recess having a rounded bottom, into which recess the nut 17 is socketed, the nut being provided with a rounded bottom of a curvature corresponding to that of the bottom of the recess. Thus it will be seen that by rotating the member 16 the nut is carried therewith and the lateral position of the clamping device altered. Thus, by virtue of these clamping devices engaging the boxes, any wear which occurs between the boxes and the wheels at 18ª may be taken care of by screwing up the clamping device on the rod 7 and excessive lateral movement prevented. The rounded seat for the nut 17 compensates for inaccuracies in manufacture and for uneven wear.

The clamping devices are adapted to be locked in position by means of the end cover members 19 of the boxes 8 which members are provided with recesses 20, 20 for engaging the ear-like portions 21, 21 of the clamp members 16. It will therefore be observed that the device cannot be adjusted without first removing the bearing box cover member 19 and when the latter is in position the adjusting device is locked. Another advantage of this arrangement is that by having the end cover serve as a locking member there is less likelihood of a truck being put into service without having the boxes properly tied together.

The cover members 19 may be secured to the bearing box proper in any suitable manner, as for example by means of the bolting flanges 20ª.

From the foregoing it will be seen that by reason of the articulated connection of the truck side members, the driving boxes may be adjusted without imparting any strains on the side members, they being free to swing toward or away from each other about the pivot pin 13.

A truck constructed in accordance with my invention is very simple to manufacture and light in construction as compared to the usual form of trucks in which the side members are rigidly connected by a cross member, which results in a cumbersome and heavy frame. The simplicity of the side members lends them very well to being made of forgings.

Furthermore it will be seen that the only stresses that the frame members are subjected to are pulling stresses, there being no appreciable side strains, as the side members do not afford lateral support for the boxes. This is another reason why the frame can be made very light.

Any suitable form of bearing devices may be associated with the truck for carrying the superimposed weight and in this instance I have shown a well known form of bearing device 22 above each of the bearing boxes 8 which does not form part of this invention and therefore will not be further described.

Reverting now to the journal box cover members 19 it will be seen that I have formed the journal box cellar 23 as an integral part with the cover members whereby the cellars may be removed with the cover plate. By this arrangement it is impossible to put a truck in service without having its cellar in place. Suitable sealing means 24 are provided on the cellars to prevent either lubricant from leaking out or grit from entering the cellar at this point. An inspection cover 19ª is provided on the cover member 19.

At the rear end of the truck I provide spring connecting members 26 for the purpose of laterally positioning a booster device 27 or other mechanism which may in part be hung from the main frame of the locomotive or other suitable supporting structure, and which is supported at its front end by the axle 6 (as seen in Fig. 2) in position to drive said axle.

I claim:—

1. A railway truck structure comprising journal boxes and articulated side frame members and means whereby said journal boxes are held in fixed lateral relation independently of said frame members.

2. A railway truck structure having opposite side frame members pivoted at their adjacent ends for independent lateral swinging.

3. A railway truck structure having a pivotal support and side frame members articulated together about the pivotal support with adjusting means for altering the lateral position of the truck journal box, said adjusting means being locked in adjusted position by the journal box.

4. In combination a railway truck structure having a pivotal support and side frame members articulated together about the pivotal support, journal boxes carried by the side frame members, covers for said journal boxes, and adjusting means for altering the lateral position of the truck journal boxes, said adjusting means being locked in adjusted position by the journal box covers.

5. A railway truck structure having a pivotal support and opposite side frame members articulated together about the pivotal support.

6. A railway truck structure having a pivotal support and side frame members articulated together about the pivotal support with adjusting means for altering the lateral position of the truck journal boxes.

7. A railway truck structure having a pivotal support and side frame members pivotally secured together at one end so as to permit relative adjustments of the free ends toward and from each other.

8. A railway truck structure having a pivotal support, opposite side frame members articulated together about the pivotal support, journal boxes associated with said frame members, and bearing devices above the journal boxes, for supporting superposed weight.

9. In combination with a truck having a frame and boxes in which an axle is journalled, tie means between the boxes, and a journal box cover with securing means for said tie means.

10. In combination with a truck having a frame and boxes in which an axle is journalled, adjustable tie means between the boxes, and a journal box cover forming a lock for said adjustable tie means.

11. In combination with a truck having a frame and boxes in which an axle is journalled, adjustable tie means between the boxes, and a combined journal box cover and lubricant cellar member forming a lock for said adjustable tie means.

12. A pivot connection for a truck, comprising opposite side frame parts articulated together and apertured to receive a truck pivot pin.

13. A pivot connection for truck frame members comprising parts articulated together and apertured to receive a truck pivot pin and having, respectively, means of attachment to opposite side frame members.

In testimony whereof, I have hereunto signed my name.

EUGENE LEVERING SCHELLENS.